United States Patent [19]

Kim

[11] Patent Number: 5,361,099
[45] Date of Patent: Nov. 1, 1994

[54] NTSC/HDTV COMMUNITY RECEIVING SYSTEM

[75] Inventor: Kyeong S. Kim, Seoul, Rep. of Korea

[73] Assignee: Goldstar Co., Ltd., Seoul, Rep. of Korea

[21] Appl. No.: 133,244

[22] Filed: Oct. 8, 1993

[30] Foreign Application Priority Data

Oct. 29, 1992 [KR] Rep. of Korea ............... 20047/1992

[51] Int. Cl.$^5$ ............................................. H04N 5/46
[52] U.S. Cl. .................................. 348/555; 348/556
[58] Field of Search ............... 348/553, 554, 555, 556, 348/557, 443, 444, 445, 458, 459, 725, 726, 727, 665, 667, 669; H04N 5/46, 7/01, 5/45

[56] References Cited

U.S. PATENT DOCUMENTS

| | | | |
|---|---|---|---|
| 5,065,243 | 11/1991 | Katagui ................... | 348/556 |
| 5,132,793 | 7/1992 | Hirahata et al. ........... | 348/556 |
| 5,146,331 | 9/1992 | Tsuchida ................. | 348/556 |
| 5,170,256 | 12/1992 | Tabata ................... | 348/556 |
| 5,173,774 | 12/1992 | Bretl et al. .............. | 348/555 |
| 5,283,653 | 2/1994 | Citta ..................... | 348/725 |

*Primary Examiner*—James J. Groody
*Assistant Examiner*—Michael H. Lee
*Attorney, Agent, or Firm*—Finnegan, Henderson, Farabow, Garrett & Dunner

[57] ABSTRACT

A NTSC/HDTV community receiving system having a microcomputer, HDTV and NTSC tuners and NTSC and HDTV intermediate frequency detectors. The system includes an A/D converter for converting HDTV and NTSC intermediate frequency signals into digital signals and a demodulator for demodulating a NTSC frame color signal into an original state and demodulating the resultant digital HDTV signal from the A/D converter into a base band level state. A first comb filter removes a NTSC interference signal from the demodulated HDTV signal and extracts a NTSC line color signal from the resultant digital NTSC signal from the A/D converter, and a second comb filter extracts a motion coefficient, the NTSC frame color signal and a NTSC frame luminance signal from the resultant digital NTSC signal from the A/D converter and the NTSC line color signal from the first cob filter. A decoder extracts original HDTV color and luminance signals from the HDTV signal from the first comb filter, and a scan rate transformer line and pixel-interpolates the resultant NTSCI and NTSCQ color signals from the demodulator and the NTSC frame luminance signal from the second comb filter to match a scan rate of the NTSC signal to that of the HDTV signal. A display state controller controls display states of the NTSC and HDTV signals.

14 Claims, 4 Drawing Sheets

NTSC/HDTV COMMUNITY RECEIVING SYSTEM

BACKGROUND OF THE INVENTION

1. Field of the Invention

The present invention relates to an NTSC/HDTV community receiving system for receiving NTSC and HDTV signals in common.

2. Description of the Prior Art

A high definition television (HDTV) system is now in the midst of development as a future-oriented television broadcasting system. By way of preparation for the practical use of the future HDTV system according to such a trend, a NTSC/HDTV community receiving system which is capable of receiving an HDTV signal as well as the present NTSC signal has been required by countries such as Korea, United States, now employing a NTSC system.

The NTSC/HDTV community receiving system may be made in various manners. In accordance with the present invention, the NTSC/HDTV community receiving system is made of common components of HDTV and NTSC receiving systems.

Referring to FIG. 1, a schematic block diagram of a conventional HDTV receiving system is shown. As shown in this drawing, the conventional HDTV receiving system includes an antenna 200 for receiving an HDTV signal, an HDTV tuner 210 for tuning the HDTV signal from the antenna 200 to a channel required by the user, an HDTV intermediate frequency detector 220 for detecting an HDTV intermediate frequency signal from the tuned HDTV signal from the HDTV tuner 210, an analog/digital (A/D) converter 230 for converting the HDTV intermediate frequency signal from the HDTV intermediate frequency detector 220 into a digital signal, a filter 240 for removing a NTSC interference signal from the resultant digital HDTV signal from the A/D converter 230, and a channel equalizer 250 for compensating for a linear channel distortion of the resultant HDTV signal from the filter 240.

The conventional HDTV receiving system also includes an error corrector 260 for comparing the resultant HDTV signal from the channel equalizer 250 with a pre-stored reference HDTV signal and correcting an error of the HDTV signal from the channel equalizer 250 in accordance with the compared result, a decoder 270 for decoding the resultant HDTV signal from the error corrector 260 to extract original HDTVI and HDTVQ color signals and an original HDTV luminance signal from the HDTV signal of the error corrector 260 which is under a compressed state, and a display processing unit 280 for processing the original HDTVI and HDTVQ color signals and the original HDTV luminance signal from the decoder 270 in a de-gamma manner to display HDTV red (R), green (G) and blue (B) signals.

The operation of the conventional HDTV receiving system with the above-mentioned construction will hereinafter be described briefly.

Upon receiving the HDTV signal of high frequency through the antenna 200, the HDTV tuner 210 tunes the HDTV signal from the antenna 200 to the channel required by the user. The HDTV intermediate frequency detector 220 detects the HDTV intermediate frequency signal of about 6 MHz from the tuned HDTV signal from the HDTV tuner 210.

The HDTV intermediate frequency signal detected by the HDTV intermediate frequency detector 220 is a composite video signal containing luminance and color signals therein, and is processed at a predetermined sampling rate in the A/D converter 230 for its conversion into the digital signal.

The NTSC interference signal is removed from the resultant digital HDTV signal from the A/D converter 230 by the filter 240. The channel equalizer 250 compensates for the linear channel distortion of the resultant HDTV signal from the filter 240 and the error corrector 260 performs the error correction of the resultant HDTV signal from the channel equalizer 250 on the basis of the pre-stored reference HDTV signal.

The decoder 270 extracts the original HDTV signal or the HDTVI and HDTVQ color signals and the HDTV luminance signal from the resultant HDTV signal of the error corrector 260 which is under the compressed state, by decoding the HDTV signal from the error corrector 260. The display processing unit 280 displays the HDTV R, G and B signals by processing the original HDTVI and HDTVQ color signals and the original HDTV luminance signal from the decoder 270 in the de-gamma manner.

Noticeably, the HDTV receiving system described herein with reference to FIG. 1 is nothing but an example of various HDTV receiving systems. However, all the various HDTV receiving systems operate to receive the HDTV signal, but all have the disadvantage that they cannot receive the presently used NTSC, PAL and SECAM signals commonly with the HDTV signal.

SUMMARY OF THE INVENTION

Therefore, the present invention has been made in view of the above problem, and it is an object of the present invention to provide a NTSC/HDTV community receiving system for receiving NTSC and HDTV signals in common in preparation for the practical use of a future HDTV system.

In accordance with the present invention, the above and other objects can be accomplished by a provision of a NTSC/HDTV community receiving system comprising system control means for generating a control signal corresponding to an HDTV system or a NTSC system according to a user's selection; first tuning means for tuning an HDTV signal to a channel required by the user; second tuning means for tuning a NTSC signal to a channel required by the user; first intermediate frequency detecting means for detecting an HDTV intermediate frequency signal from the tuned HDTV signal from the first tuning means; second intermediate frequency detecting means for detecting a NTSC intermediate frequency signal from the tuned NTSC signal from the second tuning means; analog/digital converting means responsive to the control signal from the system control means for converting the HDTV intermediate frequency signal from the first intermediate frequency detecting means and the NTSC intermediate frequency signal from the second intermediate frequency detecting means into digital signals at different sampling rates; demodulating means for demodulating a NTSC frame color signal into an original state and demodulating the resultant digital HDTV signal from the analog/digital converting means into a base band level state; first comb filtering means for removing a NTSC interference signal from the demodulated HDTV signal from the demodulating means and extracting a NTSC line color signal from the resultant digital NTSC signal from the analog/digital converting means; second comb filtering means for extracting a motion coefficient (K), the NTSC frame color signal and a NTSC frame luminance signal from the resultant digital NTSC signal from the analog/digital converting means and the NTSC line color signal from the first comb filtering means and outputting the extracted NTSC frame color signal to the demodulating means; decoding means for decoding the resultant HDTV signal from the first comb filtering means to extract original HDTV color and luminance signals from the HDTV signal from the first comb filtering means; scan rate transforming means for line and pixel-interpolating the resultant NTSCI and NTSCQ color signals from the demodulating means and the NTSC frame luminance signal from the second comb filtering means to match a scan rate of the NTSC signal to that of the HDTV signal; and display state control means for controlling display states of the resultant original HDTV color and luminance signals from the decoding means and the resultant original NTSC color and luminance signals from the scan rate transforming means.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

Figure 1:
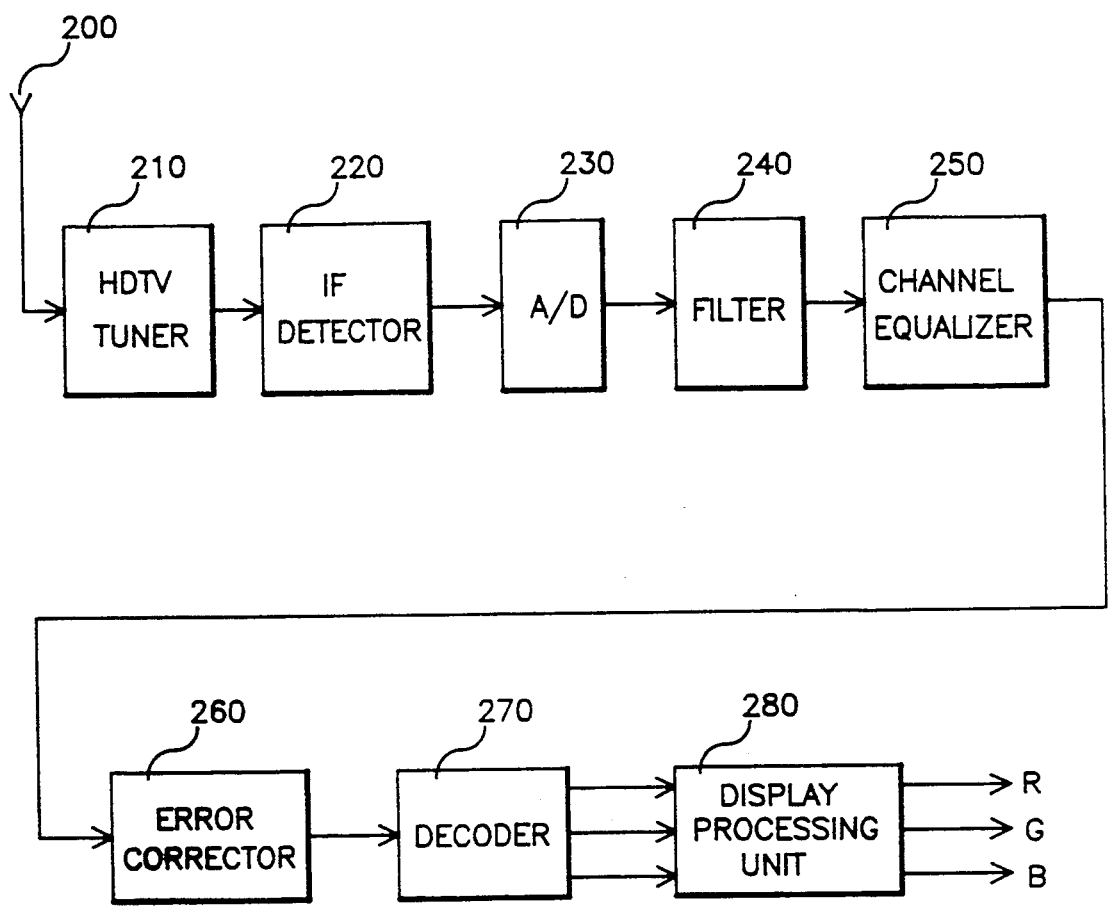
FIG. 1 is a schematic block diagram of a conventional HDTV receiving system.
Figure 2:
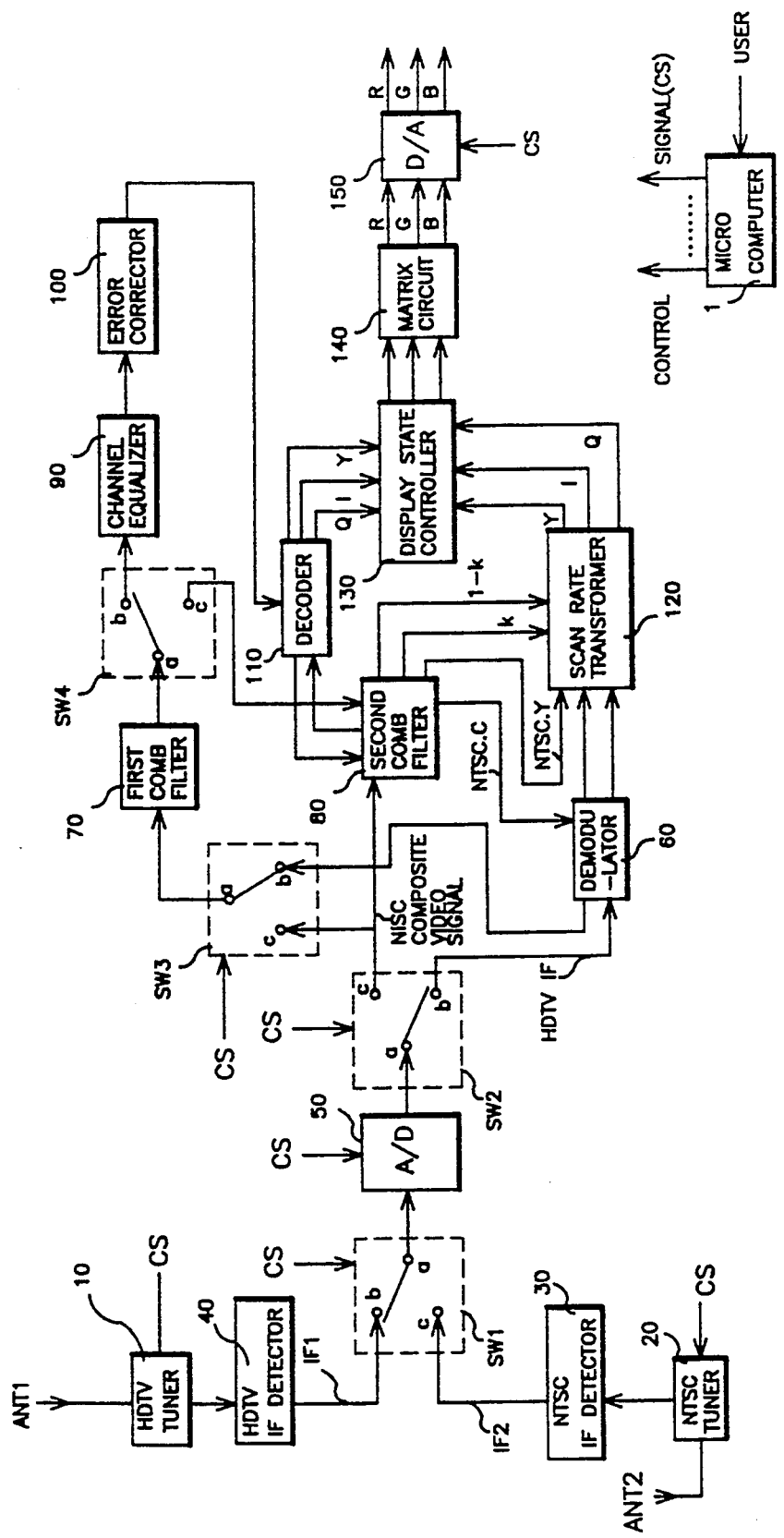
FIG. 2 is a block diagram of a NTSC/HDTV community receiving system in accordance with the present invention.

Referring to FIG. 2, there is shown a block diagram of an NTSC/HDTV community receiving system is shown in accordance with the present invention. As shown in this drawing, the NTSC/HDTV community receiving system includes a microcomputer 1 for generating a control signal corresponding to an HDTV system or a NTSC system according to a user's selection, an HDTV tuner 10 for tuning an HDTV signal to a channel desired by the user, a NTSC tuner 20 for tuning a NTSC signal to a channel desired by the user, a NTSC intermediate frequency detector 30 for detecting a NTSC intermediate frequency signal from the tuned NTSC signal from the NTSC tuner 20, an HDTV intermediate frequency detector 40 for detecting an HDTV intermediate frequency signal from the tuned HDTV signal from the HDTV tuner 10, and an analog/digital (A/D) converter 50 responsive to the control signal from the microcomputer 1 for converting the NTSC intermediate frequency signal from the NTSC intermediate frequency detector 30 or the HDTV intermediate frequency signal from the HDTV intermediate frequency detector 40 to digital signals at different sampling rates.

A demodulator 60 is provided in the NTSC/HDTV community receiving system to demodulate a NTSC frame color signal into an original state and demodulate the resultant digital HDTV signal from the A/D converter 50 into a base band level state. A first comb filter 70 is adapted to remove a NTSC interference signal from the demodulated HDTV signal and extract a NTSC line color signal from the resultant digital NTSC signal from the A/D converter 50. A second comb filter 80 is adapted to extract a motion coefficient K, the NTSC frame color signal and a NTSC frame luminance signal from the resultant digital NTSC signal from the A/D converter 50 and the NTSC line color signal from the first comb filter 70 and output the extracted NTSC frame color signal to the demodulator 60.

A channel equalizer 90 is also provided in the NTSC/HDTV community receiving system to compensate for a linear channel distortion of the resultant HDTV signal from the first comb filter 240. The linear channel distortion can be a tilt, a ghost and etc.

An error corrector 100 is also provided in the NTSC/HDTV community receiving system to compare the resultant HDTV signal from the channel equalizer 90 with a pre-stored reference HDTV signal and correct an error of the HDTV signal from the channel equalizer 90 in accordance with the compared result.

The NTSC/HDTV community receiving system also includes a decoder 110 for decoding the resultant HDTV signal from the error corrector 100 to extract original HDTV color and luminance signals from the HDTV signal of the error corrector 100 which is under a compressed state, a scan rate transformer 120 for line and pixel-interpolating the resultant NTSCI and NTSCQ color signals from the demodulator 60 and the NTSC frame luminance signal from the second comb filter 80 to match a scan rate of the NTSC signal to that of the HDTV signal, and a display state controller 130 for controlling display states or parameters of the resultant original HDTV color and luminance signals from the decoder 110 and the resultant original NTSC color and luminance signals from the scan rate transformer 120. The display states include brightness, tint, color and sharpness.

Also, the NTSC/HDTV community receiving system includes a matrix circuit 140 for extracting red (R), green (G) and blue (B) signals from output signals of the display state controller 130, and a digital/analog (D/A) converter 150 responsive to the control signal from the microcomputer 1 for converting the R, G and B signals from the matrix circuit 140 into analog signals.

Here, the reference numerals ANT1 and ANT2, not described, designate antennas for receiving the HDTV and NTSC broadcasting signals, respectively. Although not described above, according to the present invention, the second comb filter 80 may include memories used in the decoding of the HDTV composite video signal, as will be described in detail later.

A first switch SW1 is also provided in the NTSC/HDTV community receiving system to selectively output one of the output signals from the NTSC and HDTV intermediate frequency detectors 30 and 40 to the A/D converter 50 in response to a control signal from the microcomputer 1. A second switch SW2 is responsive to the control signal from the microcomputer 1 to apply the output signal from the A/D converter 50 to the demodulator 60 for the HDTV signal and to the second comb filter 80 for the NTSC signal. A third switch SW3 is also responsive to the control signal from the microcomputer 1 to selectively output one of the NTSC signal from the second switch SW2 and the HDTV signal from the demodulator 60 to the first comb filter 70. A fourth switch SW4 is also responsive to the control signal from the microcomputer 1 to apply the output signal from the first comb filter 70 to the channel equalizer 90 for the HDTV signal and to the second comb filter 80 for the NTSC signal.

Figure 3:
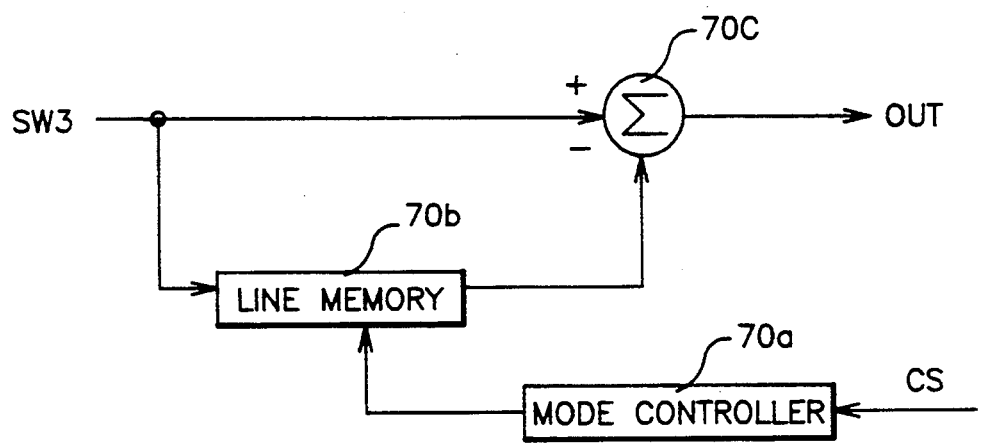
FIG. 3 is a detailed block diagram of a first comb filter in the system in FIG. 2.

FIG. 3 shows, a detailed block diagram of the first comb filter 70 in the system in FIG. 2. As shown in this drawing, the first comb filter 70 includes a mode controller 70a responsive to the control signal from the microcomputer 1 for outputting a mode signal corresponding to the NTSC system or the HDTV system, a line memory 70b responsive to the mode signal from the mode controller 70a for either the NTSC signal from the A/D converter 50 applied through the third switch SW3 by one horizontal line or the HDTV signal from the demodulator 60 applied through the third switch SW3 by 12 T (12 clocks, each having a frequency of 10.76 MHz), and a subtracter 70c for subtracting an output signal of the line memory 70b from the NTSC signal of either the A/D converter 50 or of the HDTV signal of the demodulator 60 and respectively outputting the resultant HDTV or NTSC signal to the channel equalizer 90 or the second comb filter 80 through the fourth switch SW4.

Figure 4:
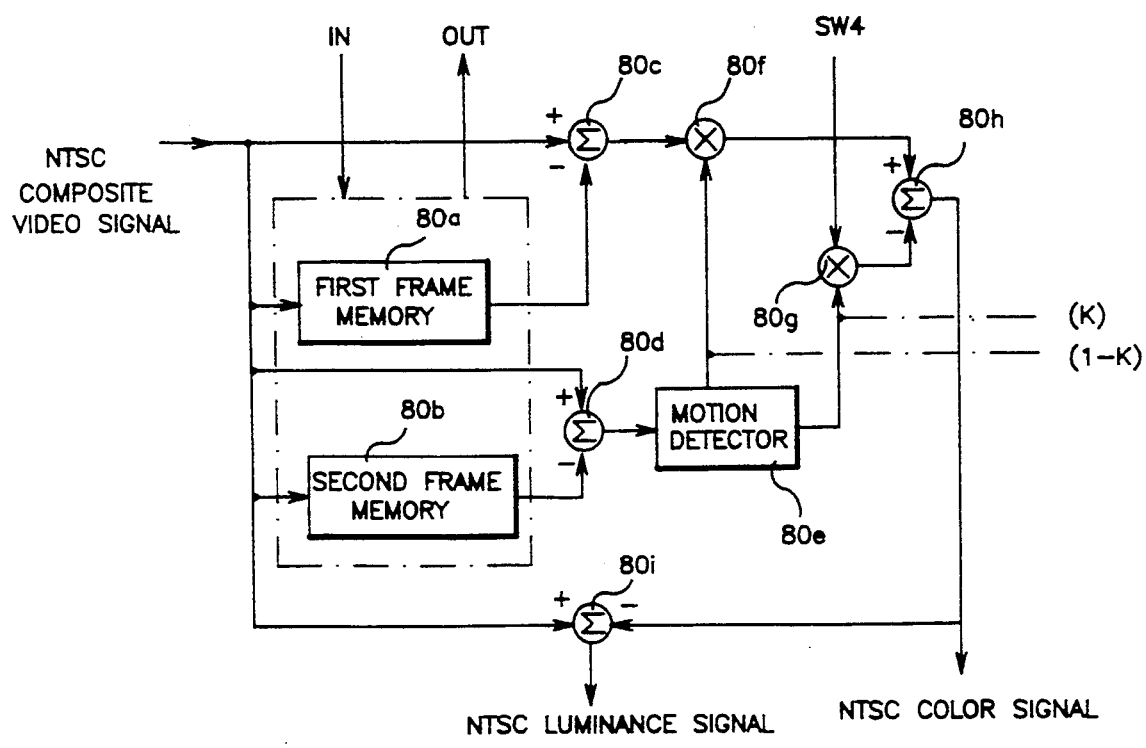
FIG. 4 is a detailed block diagram of a second comb filter in the system in FIG. 2.

FIG. 4 shows a detailed block diagram of the second comb filter 80 in the system in FIG. 2. As shown in this drawing, the second comb filter 80 includes a first frame memory 80a for delaying the NTSC signal from the A/D converter 50 applied through the second switch SW2 by one frame, a second frame memory 80b for delaying the NTSC signal from the A/D converter 50 applied through the second switch SW2 by one frame at the same time as the first frame memory 80a, a first subtracter 80c for subtracting an output signal of the first frame memory 80a from the NTSC signal of the A/D converter 50, a second subtracter 80d for subtracting an output signal of the second frame memory 80b from the NTSC signal of the A/D converter 50, and a motion detector 80e for generating the motion coefficient K and a value of 1-K in response to an output signal from the second subtracter 80d, the motion coefficient K being defined as $0 \leq K \leq 1$.

The second comb filter 80 also includes a first multiplier 80f for multiplying an output signal of the first subtracter 80c by the 1-K value from the motion detector 80e, a second multiplier 80g for multiplying the NTSC line color signal from the first comb filter 70 applied through the fourth switch SW4 by the motion coefficient K from the motion detector 80e, an adder 80h for adding output signals from the first and second multipliers 80f and 80g and outputting the added signal as the NTSC frame color signal to the demodulator 60, and a third subtracter 80i for subtracting the output signal of the adder 80h from the NTSC signal of the A/D converter 50 and outputting the subtracted signal as the NTSC frame luminance signal to the scan rate transformer 120.

Here, the first and second frame memories 80a and 80b may also be used in the decoder 110 to store the HDTV signal temporarily when the HDTV signal is received under the selection of the user.

Figure 5:
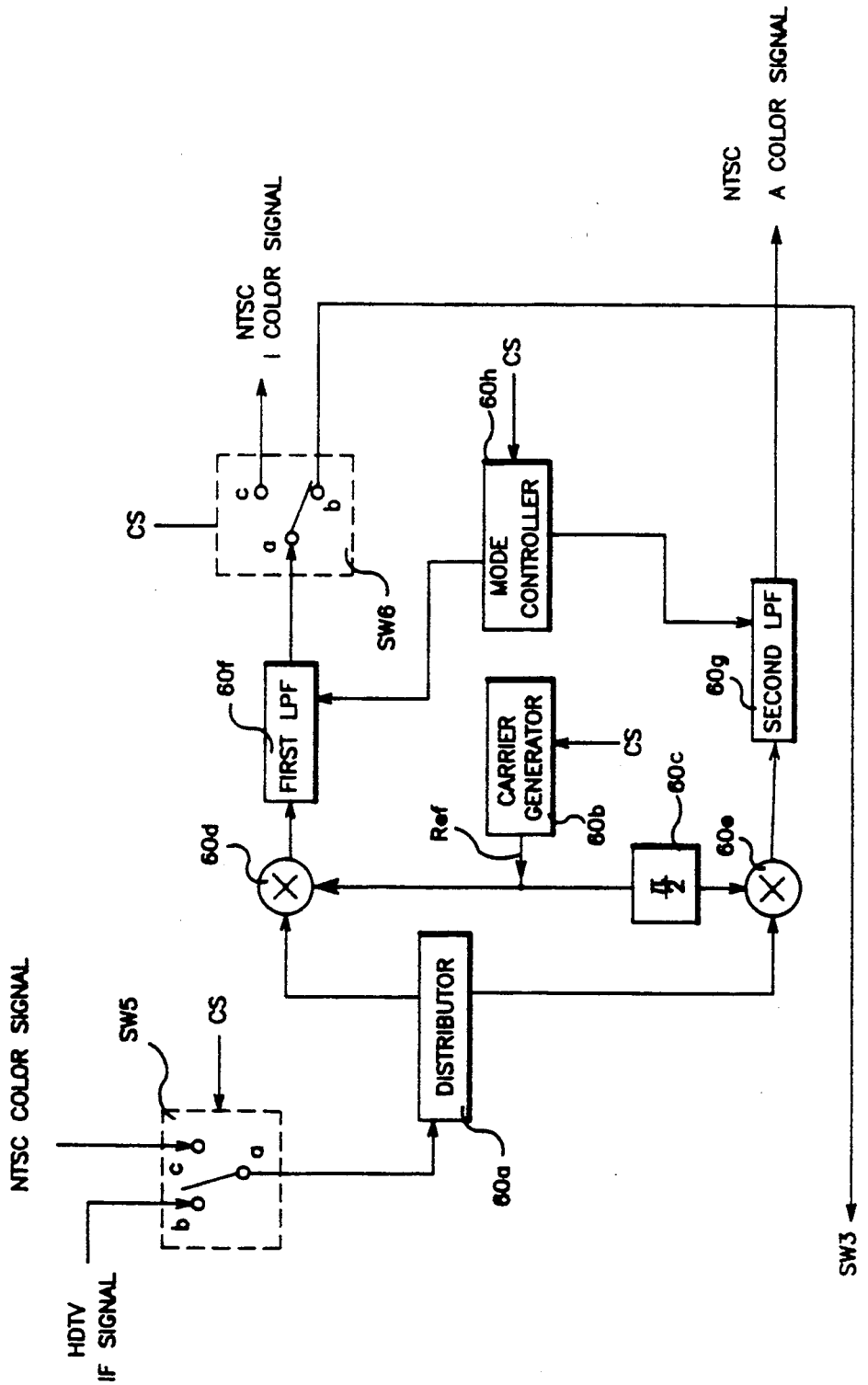
FIG. 5 is a detailed block diagram of a demodulator in the system in FIG. 2.

FIG. 5 shows a detailed block diagram of the demodulator 60 in the system in FIG. 2. As shown in this drawing, the demodulator 60 includes a fifth switch SW5 responsive to the control signal from the microcomputer 1 for selectively outputting one of the NTSC frame color signal from the second comb filter 80 and the HDTV signal from the A/D converter 50 applied through the second switch SW2, a distributor 60a for distributing an output signal from the fifth switch SW5, a carrier generator 60b responsive to the control signal from the microcomputer 1 for generating a reference signal having a center frequency of an NTSC color subcarrier or having a center frequency of 44 MHz, and a phase shifter 60c for shifting a phase of the reference signal from the carrier generator 60b by $\pi/2$.

The demodulator 60 also includes a first multiplier 60d for multiplying an output signal from the distributor 60a by the reference signal from the carrier generator 60b, a second multiplier 60e for multiplying the output signal from the distributor 60a by an output signal from the phase shifter 60c, a mode controller 60h responsive to the control signal from the microcomputer 1 for outputting a mode signal corresponding to the NTSC system or the HDTV system, a first low pass filter 60f responsive to the mode signal from the mode controller 60h for filtering an output signal from the first multiplier 60d to output the demodulated NTSCI color signal or the HDTV signal demodulated into the base band level state, a second low pass filter 60g responsive to the mode signal from the mode controller 60h for filtering an output signal from the second multiplier 60e to output the demodulated NTSCQ color signal to the scan rate transformer 120, and a sixth switch SW6 responsive to the control signal from the microcomputer 1 for applying an output signal from the first low pass filter 60f to the scan rate transformer 120 for the NTSCI color signal and to the first comb filter 70 for the HDTV signal.

In the second comb filter 80, the motion detector 80e may include a read only memory (ROM) for outputting the motion coefficient K and the 1-K value stored therein in response to an NTSC frame difference signal or the output signal from the second subtracter 80d, the motion coefficient K being defined as $0 \leq K \leq 1$.

The operation of the NTSC/HDTV community receiving system with the above-mentioned construction in accordance with the present invention will hereinafter be described in detail. The below description will be classified into the cases where the HDTV and NTSC signals are selected respectively by the user.

HDTV

Upon receiving the HDTV signal through the antenna ANT1, the HDTV tuner 10 tunes the HDTV signal to the channel desired by the user. A fixed terminal a of the first switch SW1 is connected to a movable terminal b thereof in response to the control signal CS from the microcomputer 1. The HDTV intermediate frequency detector 40 detects the HDTV intermediate frequency signal IF1 with the 44 MHz center frequency, fsc, from the tuned HDTV signal. As a result, the HDTV intermediate frequency signal IF1 from the HDTV intermediate frequency detector 40 is applied to the A/D converter 50 through the first switch SW1.

In the A/D converter 50, the HDTV intermediate frequency signal IF1 from the HDTV intermediate frequency detector 40 is processed at double the sampling rate or above (i.e., at a sampling frequency of double the 44 MHz or above) for its conversion to the digital signal. A fixed terminal a of the second switch SW1 is connected to a movable terminal b thereof in response to the control signal CS from the microcomputer 1. As a result, the sampled data or the digital HDTV intermediate frequency signal IF1 from the A/D converter 50 is applied to the demodulator 60 through the second switch SW2.

In the demodulator 60, the digital HDTV intermediate frequency signal IF1 from the A/D converter 50 is demodulated into the HDTV signal of the base band level. Namely, as shown in FIG. 5, the HDTV intermediate frequency signal IF1 is applied through the first switch SW5 to the distributor 60a, which applies the received signal to the fifth and second multipliers 60d and 60e.

The carrier generator 60b generates the reference signal Ref of the 44 MHz center frequency in response to the control signal CS from the microcomputer 1 and outputs the generated reference signal Ref to the first multiplier 60d and the phase shifter 60c. The first multiplier 60d multiplies the HDTV intermediate frequency signal IF1 from the distributor 60a by the reference signal from the carrier generator 60b and outputs the multiplied signal to the first low pass filter 60f.

The first low pass filter 60f filters the output signal from the first multiplier 60d and outputs the filtered signal as the HDTV signal demodulated into the base band level state. The demodulated HDTV signal is a band-compressed composite video signal containing a luminance signal and I and Q color signals therein. In the preferred embodiment of the present invention, the demodulated HDTV signal is outputted from only the first low pass filter 60f. To this end, the microcomputer 1 controls the mode controller 60h so that only the first low pass filter 60f can have a filtering coefficient for the demodulation of the HDTV signal.

A fixed terminal a of the sixth switch SW6 in the demodulator 60 is connected to a movable terminal b thereof in response to the control signal CS from the microcomputer 1. Also, a fixed terminal a of the third switch SW3 is connected to a movable terminal b thereof in response to the control signal CS from the microcomputer 1. As a result, the demodulated HDTV signal from the first low pass filter 60f is applied to the first comb filter 70 through the sixth switch SW6 in the demodulator 60 and the third switch SW3.

The first comb filter 70 removes the NTSC interference signal from the demodulated HDTV signal. Namely, as shown in FIG. 3, the mode controller 70a controls the line memory 70b in response to the control signal CS from the microcomputer 1. Under the control of the mode controller 70a, the line memory 70b delays the demodulated HDTV signal from the demodulator 60 by 12 clocks, each of which has the frequency of 10.76 MHz, and outputs the delayed signal to the subtracter 70c.

The subtracter 70c subtracts the output signal of the line memory 70b from the demodulated HDTV signal of the demodulator 60 and outputs the resultant HDTV signal to the fourth switch SW4. As a result, the first comb filter 70 outputs the HDTV signal in which the NTSC interference signal has been removed. At this time, since a fixed terminal a of the fourth switch SW4 is connected to a movable terminal b thereof in response to the control signal CS from the microcomputer 1, the digital HDTV signal from the first comb filter 70 is applied to the channel equalizer 90 through the fourth switch SW4.

The channel equalizer 90 compensates for the linear channel distortion of the HDTV signal from the first comb filter 70, such as tilt, the ghost and etc., and error corrector 100 compares the resultant HDTV signal from the channel equalizer 90 with a pre-stored reference HDTV signal and corrects any error in the HDTV signal from the channel equalizer 90 in accordance with the compared result. Then, the error-corrected HDTV signal from the error corrector 100 is applied to the decoder 110.

The decoder 110 stores temporarily the resultant HDTV signal from the error corrector 100 in frame units into the first and second frame memories 80a and 80b in the second comb filter 80 as shown in FIG. 4, and then reads sequentially the stored HDTV signals from the first and second frame memories 80a and 80b to decode them. As a result, the band-compressed HDTV composite video signal is restored to the original HDTV color and luminance signals I, Q and Y.

Then, the display state controller 130 controls the display states of the original HDTV color and luminance signals I, Q and Y from the decoder 110, such as brightness, tint, color and sharpness. The matrix circuit 140 extracts the R, G and B signals from the display state-controlled HDTV color and luminance signals from the display state controller 130. Finally, the D/A converter 150 converts the R, G and B signals from the matrix circuit 140 into analog signals in response to the control signal from the microcomputer 1. Accordingly, an HDTV picture is displayed on a screen.

Now, a supplementary description of the components for the process of the HDTV signal will be mentioned.

In the preferred embodiment of the present invention, a 1.5 Mbyte memory capacity is required in the decoder 110 to temporarily store the error-corrected HDTV signal. Also, the 1.5 Mbyte memory capacity can be used sufficiently to demodulate the NTSC composite video signal. Therefore, the demodulation of the NTSC composite video signal can be performed without a separate memory.

The separation of the luminance and color signals from the NTSC signal may be performed in various manners. In the preferred embodiment of the present invention, as shown in FIG. 4, the two frame memories 80a and 80b are required in the second comb filter 80 to separate the luminance and color signals from the NTSC signal adaptively to the motion of the NTSC signal. For example, in the case where the NTSC signal is sampled at a sampling frequency of 4 fsc (where, fsc is the center frequency of the color subcarrier), the frame data is 477.750 Kbyte as shown in the following equation (1):

$$\text{Total number of pixels (910)} \times \text{Total number of lines (525)} = \quad (1)$$

$$477.750 \text{ (Kbyte)}$$

Therefore, the 1.5 Mbyte memory capacity for the decoding of the HDTV signal is sufficient to separate the luminance and color signals from the NTSC signal.

Also, the display state controller 130 can control the display states of the original NTSC color and luminance signals from the scan rate transformer 120 as well as those of the original HDTV color and luminance signals from the decoder 110. This is because the NTSC signal has been line and pixel-interpolated to match the scan rate thereof to that of the HDTV signal. The construction of the display state controller 130 is well-known in the general television field and a detailed description thereof will thus be omitted. Similarly, the construction of the matrix circuit 140 is well-known in the general television field; however, the construction for the process of the HDTV signal may somewhat be different from that of the process of the NTSC signal. In the preferred embodiment of the present invention, the construction of the matrix circuit 140 is more suitable to the process of the HDTV signal.

Further, the D/A converter 150 has a clocking rate or a clocking frequency of 4788 fh (where, fh is a horizontal frequency) in the process of the HDTV signal and 3591 fh in the process of the NTSC signal in response to the control signal CS from the microcomputer 1.

NTSC

Upon receiving the NTSC signal through the antenna ANT2 under the selection of the user, the fixed terminals a of the first to fourth switches SW1-SW4 and the fifth and sixth switches SW5 and SW6 in the demodulator 60 are connected to movable terminals c thereof, respectively, in response to the control signal CS from the microcomputer 1.

The NTSC tuner 20 tunes the NTSC signal from the antenna ANT2 to the channel desired by the user. The NTSC intermediate frequency detector 30 detects the NTSC intermediate frequency signal IF2 from the tuned NTSC signal. As a result, the NTSC intermediate frequency signal IF2 from the NTSC intermediate frequency detector 30 is applied to the A/D converter 50 through the first switch SW1.

In the A/D converter 50, the NTSC intermediate frequency signal IF2 from the NTSC intermediate frequency detector 30 is processed at the sampling frequency of 4 fsc (where, fsc is the center frequency of the color subcarrier) for its conversion to the digital signal. Namely, the NTSC intermediate frequency signal IF2 from the NTSC intermediate frequency detector 30 is sampled at the sampling frequency of 14.3 MHz. The resultant digital NTSC signal from the A/D converter 50 is a composite video signal containing a luminance signal and I and Q color signals therein, and is applied simultaneously to the third switch SW3 and the second comb filter 80 through the second switch SW2. The NTSC signal to the third switch SW3 is applied to the first comb filter 70 under the control of the microcomputer 1.

The first comb filter 70 extracts the NTSC line color signal from the digital NTSC signal from the A/D converter 50 applied through the third switch SW3. Namely, as shown in FIG. 3, the NTSC signal from the A/D converter 50 is applied to the subtracter 70c and the line memory 70b. At this time, the mode controller 70a controls the delay time of the line memory 70b in response to the control signal CS from the microcomputer 1. The line memory 70b delays the NTSC signal from the A/D converter 50 by one horizontal line under the control of the mode controller 70a. The subtracter 70c subtracts the output signal of the line memory 70b from the NTSC signal of the A/D converter 50 and outputs the subtracted signal as the NTSC line color signal.

The NTSC line color signal from the subtracter 70c is applied through the fourth switch SW4 to the second multiplier 80g in the second comb filter 80 as shown in FIG. 4.

Also, as mentioned above, the digital NTSC signal from the A/D converter 50 is applied to the second comb filter 80 through the second switch SW2. In the second comb filter 80, the NTSC signal from the A/D converter 50 is applied to the first and second frame memories 80a and 80b and the first and second subtracters 80c and 80d.

The first frame memory 80a delays the NTSC signal from the A/D converter 50 by one frame and outputs the delayed signal to the first subtracter 80c. The second frame memory 80b delays the NTSC signal from the A/D converter 50 by one frame and outputs the delayed signal to the second subtracter 80d. The first subtracter 80c subtracts the output signal of the first frame memory 80a from the NTSC signal of the A/D converter 50 and outputs the subtracted signal to the first multiplier 80f. The second subtracter 80d subtracts the output signal of the second frame memory 80b from the NTSC signal of the A/D converter 50 and outputs the subtracted signal to the motion detector 80e.

Noticeably, the output signals from the first and second subtracters 80c and 80d are NTSC frame difference signals, respectively. The motion detector 80e generates the motion coefficient K and the 1-K value pre-stored therein on the basis of a level of the NTSC frame difference signal or the output signal from the second subtracter 80d. The motion coefficient K from the motion detector 80e has different weighted values according to a motion degree of the NTSC signal. Namely, when the NTSC signal is at a still state, only the output signal from the first multiplier 80f appears at the output of the adder 80h according to the motion coefficient K from the motion detector 80e. When the NTSC signal is at a motion state, only the output signal from the second multiplier 80g appears at the output of the adder 80h according to the motion coefficient K from the motion detector 80e.

The first multiplier 80f multiplies the output signal from the first subtracter 80c by the 1-K value from the motion detector 80e and outputs the multiplied signal to the adder 80h. The second multiplier 80g multiplies the NTSC line color signal from the first comb filter 70 applied through the fourth switch SW4 by the motion coefficient K from the motion detector 80e and outputs the multiplied signal to the adder 80h. As a result, the NTSC frame color signal is outputted from the adder 80h.

The third subtracter 80i subtracts the output signal of the adder 80h from the NTSC signal of the A/D converter 50 and outputs the subtracted signal as the NTSC frame luminance signal. The motion coefficient K and the 1-K value from the motion detector 80e and the NTSC frame luminance signal from the third subtracter 80i are applied to the scan rate transformer 120, and the NTSC frame color signal from the adder 80h is applied to the demodulator 60.

In the demodulator 60, as shown in FIG. 5, the NTSC frame color signal from the second comb filter 80 is applied through the fifth switch SW5 to the distributor 60a, which applies the received signal to the first and second multipliers 60d and 60e.

The carrier generator 60b generates the reference signal Ref having the center frequency fsc of the NTSC color subcarrier in response to the control signal CS from the microcomputer 1 and outputs the generated reference signal Ref to the first multiplier 60d and the phase shifter 60c. The first multiplier 60d multiplies the NTSC frame color signal from the distributor 60a by the reference signal from the carrier generator 60b and outputs the multiplied signal to the first low pass filter 60f. The phase shifter 60c shifts the reference signal from the carrier generator 60b by $\pi/2$ and outputs the $\pi/2$-shifted reference signal to the second multiplier 60e. As a result, the second multiplier 60e multiplies the NTSC frame color signal from the distributor 60a by the π/2-shifted reference signal from the phase shifter 60c and outputs the multiplied signal to the second low pass filter 60g.

The mode controller 60h controls the first and second low pass filters 60f and 60g in response to the control signal CS from the microcomputer 1 so that the first and second low pass filters 60f and 60g can have filtering coefficients for the demodulation of the NTSC signal. Under the control of the mode controller 60h, the first low pass filter 60f has a cutoff frequency of 1.5 MHz to obtain the NTSCI color signal and the second low pass filter 60g has a cut-off frequency of 0.5 MHz to obtain the NTSCQ color signal. As a result, the first low pass filter 60f outputs the NTSCI color signal to the scan rate transformer 120 and the second low pass filter 60g outputs the NTSCQ color signal to the scan rate transformer 120.

The scan rate transformer 120 line and pixel-interpolates the resultant NTSCI and NTSCQ color signals from the demodulator 60 and the NTSC frame luminance signal from the second comb filter 80 so that the NTSC signal is matched to a display specification of the HDTV signal. In other words, the horizontal frequency fh of the NTSC signal must be transformed into 3×fh. Namely, in the case where the number of active lines is 240 in the NTSC signal of one field, the scan rate transformer 120 line and pixel-interpolates the NTSC signal by 3 in a vertical direction to obtain 720 active lines per frame necessary for the HDTV signal. Also, the scan rate transformer 120 reads the inputted NTSC signal (the NTSCI and NTSCQ color signals and the NTSC luminance signal) of 4 fsc (i.e., 14.3 MHz) in a horizontal direction at the clocking rate of 3591 fh in a first-in, first-out (FIFO) manner. As a result, a 4:3 NTSC picture can be displayed on a 16:9 (1280×720) HDTV screen. Here, the horizontal frequency fh of the NTSC signal is about 56.5 MHz. Moreover, the scan rate transformer 120 performs an interpolation operation regarding the motion of the NTSC signal using the motion coefficient K and the 1-K value from the second comb filter 80.

As mentioned above, the first and second frame memories 80a and 80b in the second comb filter 80 are used in obtaining the NTSC frame difference signals in the process of the NTSC signal and in decoding the HDTV signal in the process of the HDTV signal.

Then, the display state controller 130 controls the display states of the NTSC resultant color and luminance signals I, Q and Y from the scan rate transformer 120, such as brightness, tint, color and sharpness. The matrix circuit 140 extracts the R, G and B signals from the display state-controlled NTSC color and luminance signals from the display state controller 130. Finally, the D/A converter 150 converts the R, G and B signals from the matrix circuit 140 into the analog signals in response to the control signal from the microcomputer 1. As mentioned previously, the D/A converter 150 has the clocking rate of 4788 fh in the process of the HDTV signal and 3591 fh in the process of the NTSC signal in response to the control signal CS from the microcomputer 1.

As apparent from the above description, according to the present invention, the NTSC/HDTV community receiving system can receive both the NTSC and HDTV signals by minimizing the number of components in the construction of the additional HDTV receiving system. Although the NTSC system, as the current television system has been disclosed together with the HDTV system for illustrative purpose, modifications are possible. That is, the present invention may be applied to systems for receiving SECAM, MESECAM and PAL signals in common with the HDTV signal.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A NTSC/HDTV community receiving system comprising:

system control means for generating a control signal corresponding to one of an HDTV system and a NTSC system;

first tuning means for tuning an HDTV signal to a desired channel;

second tuning means for tuning a NTSC signal to a desired channel;

first intermediate frequency detecting means for detecting an HDTV intermediate frequency signal from the tuned HDTV signal from the first tuning means;

second intermediate frequency detecting means for detecting a NTSC intermediate frequency signal from the tuned NTSC signal from the second tuning means;

analog to digital converting means responsive to the control signal from the system control means for converting the HDTV intermediate frequency signal from said first intermediate frequency detecting means and the NTSC intermediate frequency signal from said second intermediate frequency detecting means to digital signals at different sampling rates;

demodulating means for demodulating a NTSC frame color signal into an original state and demodulating the resultant digital HDTV signal from said analog to digital converting means into a base band level state;

first comb filtering means for removing a NTSC interference signal from the demodulated HDTV signal from said demodulating means and extracting a NTSC line color signal from the resultant digital NTSC signal from the analog to digital converting means;

second comb filtering means for extracting a first motion coefficient, the NTSC frame color signal and a NTSC frame luminance signal from the resultant digital NTSC signal from the analog to digital converting means and the NTSC line color signal from the first comb filtering means and outputting the extracted NTSC frame color signal to the demodulating means;

decoding means for decoding the resultant HDTV signal from said first comb filtering means to extract original HDTV color and luminance signals;

scan rate transforming means for line and pixel-interpolating resultant NTSCI and NTSCQ color signals from said demodulating means and the NTSC frame luminance signal from said second comb filtering means to match a scan rate of the NTSC signal to a scan rate of the HDTV signal; and display state control means for controlling display states of the resultant original HDTV color and luminance signals from said decoding means and the resultant original NTSC color and luminance signals from the scan rate transforming means.

2. A NTSC/HDTV community receiving system according to claim 1, further comprising:

first switching means responsive to the control signal from said system control means for selectively outputting one of output signals from the first and second intermediate frequency detecting means to said analog to digital converting means;

second switching means responsive to the control signal from said system control means for applying an output signal from said analog to digital converting means to said demodulating means when the HDTV signal is selected and to said second comb filtering means when the NTSC signal is selected;

third switching means responsive to the control signal from said system control means for selectively outputting one of the NTSC signal from said second switching means and the HDTV signal from said demodulating means to said first comb filtering means; and fourth switching means responsive to the control signal from said system control means for applying an output signal from said first comb filtering means to said decoding means when the HDTV signal is selected and to said second comb filtering means when the NTSC signal is selected.

3. A NTSC/HDTV community receiving system according to claim 1, wherein said first comb filtering means includes:

a mode controller responsive to the control signal from said system control means for outputting a mode signal corresponding to one of the NTSC system and the HDTV system;

a delay element responsive to the mode signal from said mode controller for delaying one of the NTSC signal from said analog to digital converting means by a first predetermined interval and the HDTV signal from said demodulating means by a second predetermined interval; and a subtracter for subtracting an output signal of said delay element from one of the NTSC signal of said analog to digital converting means and the HDTV signal from said demodulating means, and outputting a resultant HDTV signal to said decoding means when the HDTV signal is selected and a resultant NTSC signal to said second comb filtering means when the NTSC signal is selected.

4. A NTSC/HDTV community receiving system according to claim 3, wherein said delay element is a line memory.

5. A NTSC/HDTV community receiving system according to claim 1, wherein said second comb filtering means includes:

a first delay element for delaying the NTSC signal from said analog to digital converting means by one frame;

a second delay element for delaying the NTSC signal from said analog to digital converting means by one frame concurrently with said first delay element;

a first subtracter for subtracting an output signal of said first delay element from the NTSC signal of said analog to digital converting means;

a second subtracter for subtracting an output signal of said second delay element from the NTSC signal of said analog to digital converting means;

a motion detector for generating the motion coefficient and a second coefficient in response to an output signal from said second subtracter;

a first multiplier for multiplying an output signal from said first subtracter by the second coefficient;

a second multiplier for multiplying the NTSC line color signal from said first comb filtering means by the motion coefficient;

an adder for adding output signals from said first and second multipliers and outputting the added signal as the NTSC frame color signal to said demodulating means; and a third subtracter for subtracting the output signal of said adder from the NTSC signal of said analog to digital converting means and outputting the subtracted signal as the NTSC frame luminance signal to said scan rate transforming means.

6. A NTSC/HDTV community receiving system according to claim 5, wherein said first and second delay elements are frame memories.

7. A NTSC/HDTV community receiving system according to claim 1, wherein the demodulating means includes:

a fifth switch responsive to the control signal from said system control means for selectively outputting one of the NTSC frame color signals from said second comb filtering means and the HDTV signal from said analog to digital converting means;

a distributor for distributing an output signal from said fifth switch;

a carrier generator responsive to the control signal from said system control means for generating a reference signal of a predetermined frequency corresponding to one of the NTSC system and the HDTV system;

a phase shifter for shifting a phase of the reference signal from said carrier generator by a predetermined amount;

a first multiplier for multiplying an output signal from said distributor by the reference signal from said carrier generator;

a second multiplier for multiplying the output signal from said distributor by an output signal from said phase shifter;

a mode controller responsive to the control signal from said system control means for outputting a mode signal corresponding to one of the NTSC system and the HDTV system;

a first filter responsive to the mode signal from said mode controller for filtering an output signal from said first multiplier to output one of the demodulated NTSCI color signal and the HDTV signal demodulated into the base band level state;

a second filter responsive to the mode signal from said mode controller for filtering an output signal from said second multiplier to output the demodulated NTSCQ color signal to said scan rate transforming means; and a sixth switch responsive to the control signal from said system control means for applying an output signal from said first filter to said scan rate transforming means when the NTSCI color signal is selected and to said first comb filtering means when the HDTV signal is selected.

8. A NTSC/HDTV community receiving system according to claim 7, wherein the reference signal from said carrier generator has a center frequency of a NTSC color subcarrier for the NTSC signal and a center frequency of 44 MHz for the HDTV signal under the control of said system control means.

9. A NTSC/HDTV community receiving system according to claim 1, further comprising:
   matrix means for extracting color signals from output signals of said display state control means; and
   digital to analog converting means responsive to the control signal from said system control means for converting the color signals from said matrix means to analog signals.

10. A NTSC/HDTV community receiving system according to claim 1, wherein said scan rate transforming means transforms a horizontal frequency of the NTSC signal to three times the horizontal frequency in a vertical direction and reads the NTSC signal in a horizontal direction at a predetermined clocking rate.

11. A NTSC/HDTV community receiving system according to claim 1, further comprising:
   channel equalizing means for compensating for a linear channel distortion of the resultant HDTV signal from said first comb filtering means; and
   error correcting means for comparing the resultant HDTV signal from said channel equalizing means with a pre-stored reference HDTV signal and correcting an error of the HDTV signal from said channel equalizing means in accordance with the compared result.

12. A NTSC/HDTV community receiving system according to claim 5, wherein the motion coefficient represented as K and the second coefficient represented as (1-K) are defined as $0 \leq K \leq 1$.

13. A NTSC/HDTV community receiving system according to claim 9, wherein the color signals are red, green and blue signals.

14. A NTSC/HDTV comunity receiving system according to claim 10, wherein the scan rate transforming means reads the NTSC signal in the horizontal direction at a clocking rate of 3591 fh (horizontal frequency) in a first-in, first-out manner to display a 4:3 NTSC picture on a 16:9 HDTV screen.

* * * * *

UNITED STATES PATENT AND TRADEMARK OFFICE
CERTIFICATE OF CORRECTION

PATENT NO. : 5,361,099
DATED : November 01, 1994
INVENTOR(S) : Kyeong Seop KIM

It is certified that error appears in the above-indentified patent and that said Letters Patent is hereby corrected as shown below:

Claim 1, column 12, line 26 change "the" (second occurrence) to --said--.

Claim 1, column 12, line 58 change "the" (second occurrence) to --said--.

Abstract, line 17, "cob" change --comb--.

Signed and Sealed this

Second Day of May, 1995

Attest:

BRUCE LEHMAN

Attesting Officer          Commissioner of Patents and Trademarks